(12) United States Patent
Wang

(10) Patent No.: US 9,612,477 B2
(45) Date of Patent: Apr. 4, 2017

(54) TRANSPARENT DISPLAY DEVICE

(71) Applicant: BOE Technology Group Co., Ltd., Beijing (CN)

(72) Inventor: Shang Wang, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 127 days.

(21) Appl. No.: 14/480,893

(22) Filed: Sep. 9, 2014

(65) Prior Publication Data

US 2015/0316816 A1    Nov. 5, 2015

(30) Foreign Application Priority Data

May 4, 2014  (CN) .......................... 2014 1 0185059

(51) Int. Cl.
*G02F 1/1335*    (2006.01)
(52) U.S. Cl.
CPC .... *G02F 1/13362* (2013.01); *G02F 1/133528* (2013.01); *G02F 2001/13355* (2013.01); *G02F 2001/133545* (2013.01); *G02F 2001/133616* (2013.01)
(58) Field of Classification Search
CPC ........... G02F 1/133528; G02F 1/13362; G02F 2001/13355; G02F 2001/133545; G02F 2001/133616
USPC ......................................................... 349/96
See application file for complete search history.

(56) References Cited

U.S. PATENT DOCUMENTS

| 5,963,280 A * | 10/1999 | Okuda | G01C 21/365 349/64 |
| 2010/0157400 A1* | 6/2010 | Dimov | G02B 5/188 359/13 |
| 2010/0177025 A1* | 7/2010 | Nagata | G02B 6/0028 345/76 |
| 2011/0096100 A1* | 4/2011 | Sprague | G02B 27/286 345/690 |
| 2013/0182302 A1* | 7/2013 | Shikii | B60K 35/00 359/13 |

* cited by examiner

*Primary Examiner* — Charles Chang
(74) *Attorney, Agent, or Firm* — Westman, Champlin & Koehler, P.A.

(57) ABSTRACT

The present invention discloses a transparent display device comprising a display panel, an array of polarization light splitting sheets provided on the side of the display panel on which no polarizer is provided, and at least one polarization light sources provided at a side of the array and emitting a polarized light polarized along a certain direction towards an inner surface of at least one polarization light splitting sheets in the array. The polarized light polarized in the certain direction, emitted by a corresponding polarization light source and incident onto the inner surface of the polarization light splitting sheet can be reflected to the display panel, and the polarized light polarized in a direction perpendicular to the certain direction, coming from an ambient light and incident onto an outer surface of the polarization light splitting sheet can be transmitted to the display panel.

19 Claims, 3 Drawing Sheets

TRANSPARENT DISPLAY DEVICE

CROSS-REFERENCE TO RELATED APPLICATION

This application claims the benefit of Chinese Patent Application No. 201410185059.2 filed on May 4, 2014 in the State Intellectual Property Office of China, the whole disclosure of which is incorporated herein by reference.

BACKGROUND OF THE INVENTION

Field of the Invention

Embodiments of the present invention relate to the technical field of display, and more particular, to a transparent display device.

Description of the Related Art

With the development of display technique and increasing demands on usage of portable information medium, researches on transparent display device are becoming increasingly noticeable. The transparent display device is such a display device that information displayed on its display panel can be seen when a voltage is applied, and that a real object behind its display panel can be seen through the display panel when no voltage is applied. The transparent display device is particularly applied to applications, such as a show window, an exhibition stand, a vehicle window and the like.

Specifically, similar to a general liquid crystal display device, the display panel of the transparent display device also comprises a color filter substrate, an array substrate and a liquid crystal layer filled between the color filter substrate and the array substrate. Furthermore, since the display panel of the transparent display device passively emits a light, a backlight source is needed for the display panel. For instance, a transparent light guide plate may be provided at a light entering side of the display panel, and a backlight source, such as a LED lamp and the like, may be provided at a side of the transparent light guide plate. Thus, the light emitted from the backlight source is refracted onto the display panel through the transparent light guide plate so as to be used for display.

However, when the backlight source is configured in the above mentioned way, since the transparent light guide plate has a certain thickness, it may negatively influence the whole transparency of the transparent display device, and thus a transparent effect of the transparent display device may be reduced. Further, since, for the purpose of image display, the array substrate and the color filter substrate of the display panel of the transparent display device are usually provided, at sides thereof facing away from the liquid crystal layer, with corresponding polarizers, so as to convert a nature light emitted from the backlight source into a corresponding linearly polarized light, only a very small part of the nature light emitted from the backlight source can be transmitted through the display panel to display images. As a result, the light transmittance of the display panel is remarkably reduced and the transparent effect of the display panel is further reduced.

SUMMARY OF THE INVENTION

Embodiments of the present invention provide transparent display devices intended to solve the problems that the existing transparent display device has a low light transmittance and a bad transparent effect.

An embodiment of the present invention provides a transparent display device, comprising: a display panel with a polarizer being provided on one side thereof and no polarizer being provided on the other side thereof; an array of polarization light splitting sheets provided on the side of the display panel on which no polarizer is provided, wherein a plane where the lines connecting a top and a bottom of the polarization light splitting sheets in the array of polarization light splitting sheets exist is arranged at a first inclination angle to the display panel, and the first inclination angle is greater than zero degree and less than 90 degrees; and at least one polarization light sources provided at one side of the array of polarization light splitting sheets and emitting a polarized light in a certain direction towards an inner surface of at least one polarization light splitting sheets in the array of polarization light splitting sheets;

wherein the polarized light polarized in the certain direction, emitted by a corresponding polarization light source of the at least one polarization light sources and incident onto the inner surface of the polarization light splitting sheet can be reflected to the display panel, and the polarized light polarized in a direction perpendicular to the certain direction, from an ambient light and incident onto an outer surface of the polarization light splitting sheet and can be transmitted to the display panel;

wherein the inner surface of each polarization light splitting sheet is the surface of the polarization light splitting sheet facing the display panel, and the outer surface of each polarization light splitting sheet is the surface of the polarization light splitting sheet facing away from the display panel.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF EMBODIMENTS

Figure 1:
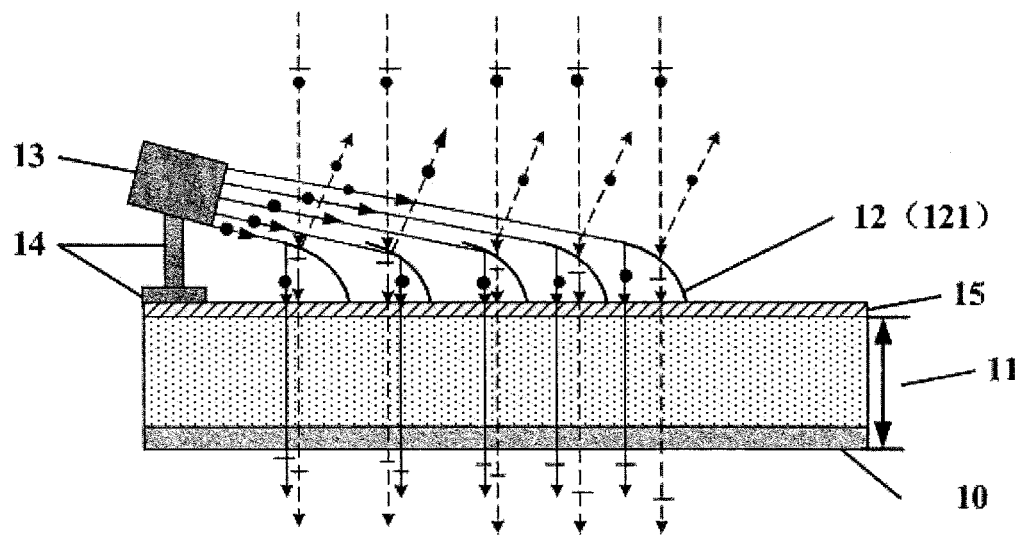
FIG. 1 is a schematic view of a structure of a transparent display device in accordance with an embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
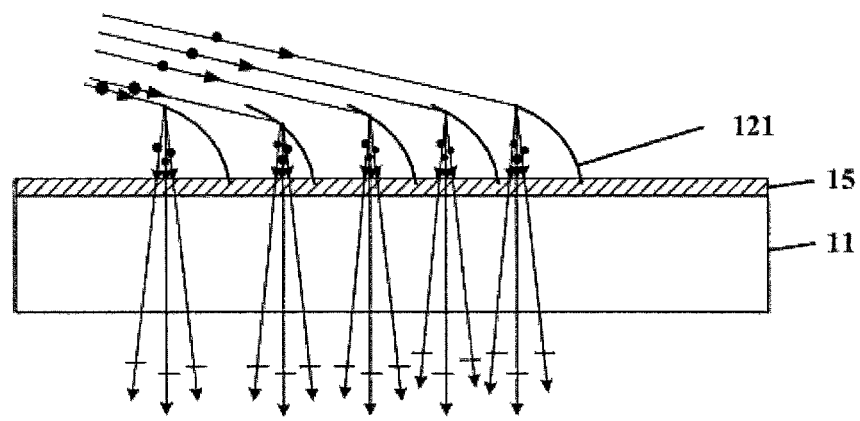
FIG. 2 is a light path diagram showing how a polarized light emitted from a polarization light source is used to realize backlight display in a case where the polarization light source is turned on, in accordance with an embodiment of the present invention.
Figure 3:
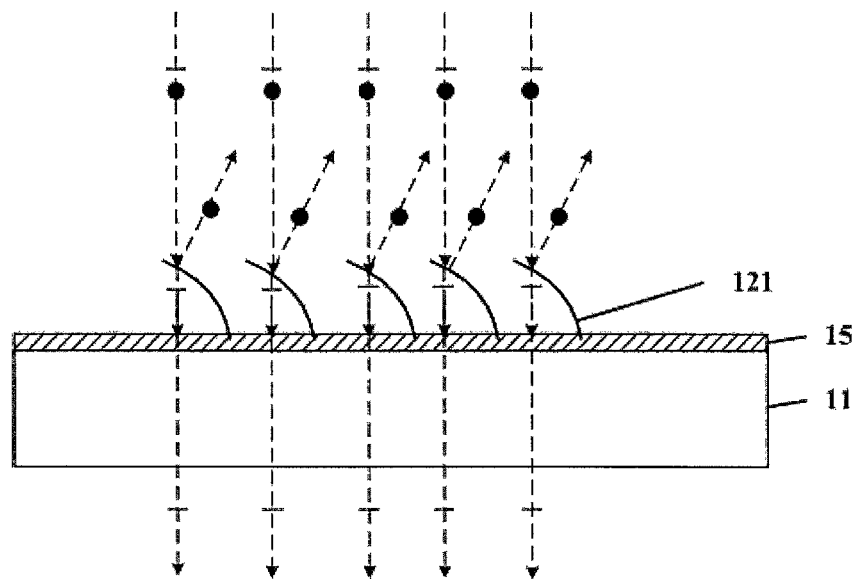
FIG. 3 is a light path diagram showing how an ambient light is used to realize transparent display in a case where the polarization light source is turned off, in accordance with an embodiment of the present invention.

With reference to FIG. 1, a schematic view of a structure of the transparent display device in accordance with an embodiment of the present invention is shown. The transparent display device according to the embodiment of the present invention comprises a display panel 11 with a polarizer 10 being provided on one side thereof and no polarizer being provided on the other side thereof, and an array 12 of polarization light splitting sheets provided on the side of the display panel 11 on which no polarizer is provided. The array 12 of polarization light splitting sheets 12 may comprise one or more polarization light splitting sheets 121. For each polarization light splitting sheet 121 of the array 12, a plane where the lines connecting the top and the bottom of each polarization light splitting sheet exist is arranged at a first inclination angle to the display panel 11, and the first inclination angle is greater than zero degree and less than 90 degrees. The transparent display device further comprises at least one polarization light source 13 provided at one side of the array 12 of polarization light splitting sheets and emitting a polarized light polarized in a certain direction towards the inner surface of at least one polarization light splitting sheets 121 of the array 12. The polarized light polarized in the certain direction, emitted from a corresponding polarization light source 13 of the at least one polarization light sources 13 and incident onto the inner surface of the polarization light splitting sheet 121 can be reflected to the display panel 11 (specifically shown in FIG. 1 or FIG. 2, FIG. 2 is a light path diagram showing how the polarized light emitted from the polarization light source 13 is used to realize backlight display when the polarization light source 13 is turned on, wherein the polarized light polarized in the certain direction and emitted from the polarization light source 13 is indicated by solid lines with black spots). The polarized light polarized in a direction perpendicular to the certain direction, coming from an ambient light and incident onto an outer surface of each of the polarization light splitting sheet 121s can be transmitted to the display panel 11 (specifically shown in FIG. 1 or FIG. 3, FIG. 3 is a light path diagram showing how the ambient light is used to realize transparent display when the polarization light source 13 is turned off, wherein the polarized light polarized in the certain direction and coming from the ambient light is indicated by dashed lines with black spots, and the polarized light polarized in the direction perpendicular to the certain direction and coming from the ambient light is indicated by dashed lines with transverse line segments). The inner surface of each of the polarization light splitting sheet 121s is the surface of the polarization light splitting sheet 121 facing the display panel 11, and the outer surface of the polarization light splitting sheet 121 is the surface of the polarization light splitting sheet 121 facing away from the display panel 11.

In other words, in the embodiment of the present invention, each of the polarization light splitting sheets 121 of the array 12 is configured to reflect the polarized light polarized in the certain direction, emitted from a corresponding polarization light source 13 of the at least one polarization light sources 13 and incident onto the inner surface thereof to the display panel 11 and is configured to transmit the polarized light polarized in a direction perpendicular to the certain direction, coming from an ambient light to the display panel 11 and incident onto the outer surface thereof and.

In the embodiment of the present invention, when a backlight is needed, the polarization light source 13 capable of emitting the polarized light polarized in the certain direction can be used as a backlight source, and at the same time, the array 12 of polarization light splitting sheets, which is provided at the side of the display panel 11 of the transparent display device on which no polarizer is provided, is used to reflect the polarized light polarized in the certain direction and emitted from the polarization light source 13 to the display panel 11 of the transparent display device so as to realize a corresponding backlight. When no backlight is needed (at this time the polarization light source 13 may be in an off state), the array 12 of polarization light splitting sheets is used to transmit the polarized light polarized in the direction perpendicular to the certain direction and coming from the ambient light to the display panel 11 so as to realize transparent display. In this way, based on realization of an adjustable backlight source for transparent display, the light transmittance and the transparent effect of the display device can be enhanced and practicability of the display device can be improved.

In particular, in the embodiment of the present invention, the polarized light polarized in the certain direction may be an S polarized light, and correspondingly the polarized light polarized in the direction perpendicular to the certain direction may be a P polarized light.

In accordance with the prior art, the P, S polarized lights may be defined as follows. When a light ray is incident onto a surface of an optical element at a non-vertical angle, both of reflection and transmission properties depend on a polarization phenomenon. In this case, a coordinate system used is defined by a plane containing an incidence light beam and a reflection light beam. If a polarization vector of the light ray is in this plane, the light ray is referred as a P polarized light, and if the polarization vector of the light ray is perpendicular to this plane, the light ray is referred as an S polarized light. One skilled in the art can appreciate that any kind of input polarization state can be represented by a vector sum of an S component and a P component.

Further, it should be noted that in the embodiment of the present invention, for the at least one polarization light splitting sheet 121 in the array 12 of polarization light splitting sheets, after the polarized light polarized in the certain direction (usually the S polarized light), emitted by the corresponding polarization light source 13 and incident onto the inner surface of the at least one polarization light splitting sheet 121 is reflected to the display panel 11 by the at least one polarization light splitting sheet 121, the polarized light polarized in the certain direction (usually the S polarized light) is converted into the polarized light polarized in the direction perpendicular to the certain direction (usually the P polarized light) by means of deflection of the liquid crystal within the display panel 11 and then exits from the display panel 11 (specifically shown in FIG. 2, the polarized light polarized in the direction perpendicular to the certain direction, which is converted from the polarized light polarized in the certain direction and emitted by the polarization light source 13, is indicated by solid lines with transverse line segments, so that a backlight effect for transparent display can be realized. Furthermore, when the polarized light polarized in the certain direction (usually the S polarized light) and coming from the polarization light source 13 is reflected, there is a certain angle of divergence, as shown in FIG. 2. The detailed description about it is omitted herein.

Further, it should be noted that for the at least one polarization light splitting sheet 121 in the array 12 of polarization light splitting sheets, after the polarized light polarized in the direction perpendicular to the certain direction (usually the P polarized light), coming from the ambient light and incident onto the outer surface of the at least one polarization light splitting sheet 121 is transmitted to the display panel 11 by the at least one polarization light splitting sheet 121, the polarized light polarized in the direction perpendicular to the certain direction (usually the P polarized light) may exit from a front surface of the display panel 11 (the side of the display panel 11 provided with the polarizer) to realize transparent display. Further, for the at least one polarization light splitting sheet 121 in the array 12 of polarization light splitting sheets, while the polarized light polarized in the direction perpendicular to the certain direction (usually the P polarized light), coming from the ambient light and incident onto the outer surface of the at least one polarization light splitting sheet 121 is transmitted to the display panel 11, the polarized light polarized in the certain direction (usually the S polarized light), coming from the ambient light and incident onto the outer surfaces of the at least one polarization light splitting sheet 121 can be reflected accordingly (especially shown in FIG. 3). The detailed description thereof is omitted herein.

Further, it should be noted that in the embodiment of the present invention, the display panel 11 may comprise a color filter substrate, an array substrate and a liquid crystal layer filled between the color filter substrate and the array substrate. The polarizer 10 may be provided at the side on which the color filter substrate is provided. That is, the side of the display panel 11 on which the polarizer 10 is provided usually indicates a side of the color filter substrate facing away from the liquid crystal layer, and the other side of the display panel 11 on which no polarizer is provided usually indicates a side of the array substrate facing away from the liquid crystal layer. The detailed description about it is omitted herein.

Further, in the embodiment of the present invention, for each of the polarization light splitting sheets 121 in the array 12 of polarization light splitting sheets, the plane where the lines connecting the top and bottom of each polarization light splitting sheets exist 121 usually refers to a plane in which a polygon formed by any one point (or more points) at the top of the polarization light splitting sheet 121 and any two or more points at the bottom of the polarization light splitting sheet 121 lies.

Further, the first inclination angle between the plane where the lines connecting the top and bottom of the polarization light splitting sheet 121 exist and the side of the display panel 11 facing the array 12 of polarization light splitting sheets may be between 30° and 60°, so that the polarized light polarized in the certain direction and emitted from the polarization light source 13 can be, to a greater extent, reflected to the display panel 11 of the transparent display device to realize a corresponding backlight effect while retaining a proper thickness of the display device.

Further, in the embodiment of the present invention, the sizes and the structures of the respective polarization light splitting sheets 121 in the array 12 of polarization light splitting sheets may be the same. Further, as shown in FIG. 2 or 3, in the embodiment of the present invention, the respective polarization light splitting sheets 121 in the array 12 of polarization light splitting sheets are usually arc-shaped polarization light splitting sheets (the polarization light splitting sheets having arc-shaped longitudinal sections) to increase the divergence angle of the polarized light reflected to the display panel 11. It should be noted that the respective polarization light splitting sheets 121 may be linear polarization light splitting sheets having linear longitudinal sections. The embodiments of the present invention do not limit it.

Figure 4:
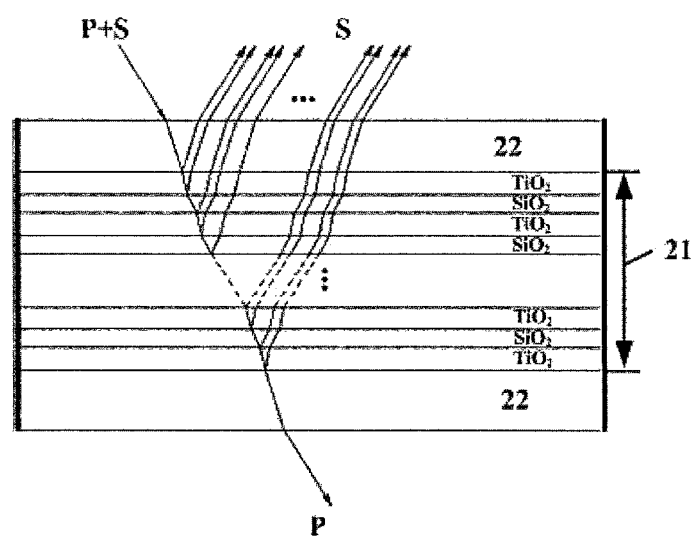
FIG. 4 is a schematic view of a structure of a polarization light splitting sheet in accordance with an embodiment of the present invention, schematically showing the transmission and the reflection of P, S polarized light with respect to the polarization light splitting sheet.

Further, as shown in FIG. 4 (FIG. 4 is a schematic view of a structure of a polarization light splitting sheet 121 in accordance with an embodiment of the present invention, schematically showing transmission and reflection of P, S polarized light with respect to the polarization light splitting sheet 121), for each of the polarization light splitting sheets 121 in the array 12 of polarization light splitting sheets, the polarization light splitting sheet 121 may comprise a reflection layer 21. Usually, the reflection layer 21 may be formed by a multi-layer film. The multi-layer film is formed by alternatively arranging two kinds of materials having different refractive indexes. Thus, light splitting of the incidence light along different polarization directions can be realized by the multi-layer film arrangement formed by alternatively stacking materials having high and low refractive indexes.

Further, in the embodiment of the present invention, a first layer of film and the last layer of film in the reflection layer 21 usually are made of the same material to form a stack structure of {(the material having a high refractive index, the material having a low refractive index)$^n$ the material having a high refractive index} or a stack structure of {(the material having a low refractive index, the material having a high refractive index)$^n$ the material having a low refractive index}. The embodiments of the present invention do not limit this. It should be noted that the reflection layer 21 may employ other stack structures as long as the polarized light polarized along the certain direction can be reflected and the polarized light polarized in the direction perpendicular to the certain direction can be transmitted. The embodiments of the present invention do not limit this. Specifically, in the schematic view of the structure of the polarization light splitting sheet 121 as shown in FIG. 4, the reflection layer 21 has the stack structure of {(the material having a high refractive index, the material having a low refractive index)$^n$ the material having a high refractive index}.

Further, in the embodiment of the present invention, in order to facilitate selection of materials and reduce the cost of the materials, the two kinds of materials in the reflection layer 21 may typically be titanium dioxide ($TiO_2$) having a relatively high refractive index and silicon dioxide ($SiO_2$) having a relatively low refractive index, respectively. The detailed description thereof is omitted herein.

Further, as shown FIG. 4, in order to protect the reflection layer 21, the polarization light splitting sheet 121 may further comprise protection layers 22 provided at two sides of the reflection layer 21. Further, in order to achieve a good light-transmitting effect, the protection layers 22 usually are transparent materials.

Further, in order to facilitate selection of materials and reduce the cost of the materials, the protection layers 22 may be made of material having a refractive index lying between the refractive indexes of the two kinds of materials in the reflection layer 21 (including the refractive indexes of the two kinds of materials in the reflection layer 21).

For example, as shown in FIG. 4, when the two kinds of materials in the reflection layer 21 are titanium dioxide ($TiO_2$) and silicon dioxide ($SiO_2$), respectively, the protection layer 22 may be formed from transparent material, such as glass (its refractive index is less than that of titanium dioxide, but greater than or equal to that of silicon dioxide). In this case, the film layer structure of the polarization light splitting sheet 121 can be represented as {a transparent material such as glass/($TiO_2$/$SiO_2$)"$TiO_2$/a transparent material such as glass}. The detailed description thereof is omitted herein. Accordingly, the schematic view of transmittance and reflection of the P, S polarized lights with respect to the polarization light splitting sheet 121 is shown in FIG. 4. The detailed description about it is omitted herein.

It should be noted that the protection layers 22 may be of any material that has a refractive index greater than that of the material having a high refractive index in the reflection layer 21 or has a refractive index less than that of the material having a low refractive index in the reflection layer 21. The embodiments of the present invention do not limit it.

Further, it should be noted that each layer of film in the multi-layer film of the reflection layer 21 usually has a thickness equal to ¼ of a main wavelength of the polarized light emitted from the polarization light source 13 so as to form a phenomenon of reflection reducing film by means of stack of the film layers and the film layer structure having a thickness of ¼ of the main wavelength, so that the polarized light polarized in the certain direction can be fully reflected and the polarized light polarized in the direction perpendicular to the certain direction can be fully transmitted.

Further, in the embodiment of the present invention, horizontal projections of all the polarization light splitting sheets 121 in the array 12 of polarization light splitting sheets on the display panel 11 may completely cover a display region of the display panel 11 to reflect, to the greater extent, the polarized light polarized in the certain direction and emitted from the polarization light source 13 to the display panel 11 of the transparent display device, thereby realizing a corresponding backlight, or to transmit the polarized light polarized in the direction perpendicular to the certain direction and coming from the ambient light to the display panel 11 of the transparent display device, thereby realizing a corresponding transparent display effect.

In an embodiment, horizontal projections of any two adjacent polarization light splitting sheets 121 in the array 12 of polarization light splitting sheets on the display panel 11 may be partly overlapped with each other, or contact but not overlapped with each other. The embodiments of the present invention do not limit this.

Further, in the embodiment of the present invention, the at least one polarization light source 13 may be collimation polarization light sources so as to reduce luminous angles of the light sources and to improve utilization rate of the light sources.

Figure 5:
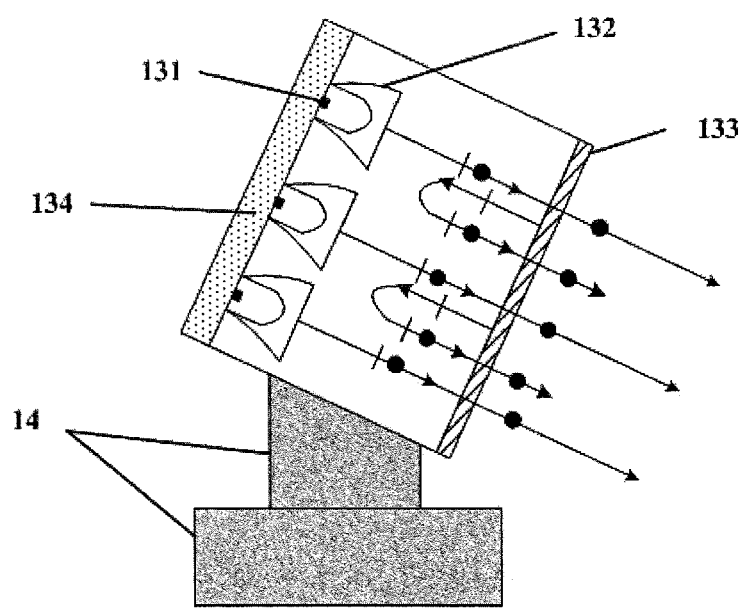
FIG. 5 is a schematic view of a structure of the polarization light source in accordance with an embodiment of the present invention.

In particular, as shown in FIG. 5 (FIG. 5 is a schematic view of the structure of the polarization light source 13), for any one of the polarization light sources 13, when the polarization light source 13 is a collimation polarization light source, the polarization light source 13 may comprise at least one light source chip 131, at least one collimator 132 configured to collimate the light ray emitted from the light source chips 131, and a light-converting element 133 configured to convert the light ray treated by the collimators 132 into the polarized light polarized in the certain direction. The light-converting element 133 may be disposed at the front of a light barrel of the light source containing the at least one light source chip 131 and the at least one collimator 132.

In an embodiment, the light-converting element 133 may be a dual brightness enhancement film (DBEF). A core layer of the DBEF may be a thousand-layer film structure developed by 3M Corporation to realize transmission of the polarized light polarized in the certain direction (e.g., the S polarized light) and reflection of the polarized light polarized in the direction perpendicular to the certain direction (e.g., the P polarized light). It should be noted that since the DBEF may be provided at the front of the light barrel of the light source, the polarized light polarized in the direction perpendicular to the certain direction (e.g., the P polarized light) and reflected back may be depolarized again, such that the polarized light polarized in the certain direction (e.g., the S polarized light) is formed to be emitted, thereby improving utilization rate of the light sources, especially with reference to FIG. 5.

Further, the light source chip 131 may be a LED chip or a white light source similar to a point light source, such as a metal halogen lamp. The embodiments of the present invention do not limit this.

Further, it should be noted that in the embodiment of the present invention, the collimator 132 may be a lens structure having a free-from surface, a bottom surface and side walls of which are designed as free-from surfaces, thereby realizing a good collimation effect to the light ray emitted from the light sources.

Further, as shown in FIG. 5, for each of the polarization light sources 13, the polarization light source 13 may further comprise supporting and heat dissipating elements 134 configured to support the light source chips 131 and the collimators 132 and configured to provide a heat dissipation function for the light source chips 131.

In other words, for each of the polarization light sources 13, at least one light source chip 131 may be attached onto respective support and heat dissipation elements 134, and the respective collimators 132 are mounted above the respective light source chips 131, and the DBEF is mounted at the front of the whole light barrel of the light source containing the at least one light source chip 131 and the at least one collimator 132. The detailed description about it is omitted herein.

Further, as shown in FIG. 1 or FIG. 5, the transparent display device may further comprise at least one light source bracket 14 configured for installation of the polarization light sources 13. The respective polarization light sources 13 are mounted on the respective light source brackets 14. Further, the respective polarization light sources 13 may be obliquely arranged in such a manner that the central axes of the respective polarization light sources 13 are arranged at a second inclination angle to the display panel 11. The central axes of the respective polarization light sources 13 are parallel to the polarized light polarized in the certain direction and emitted by the respective polarization light sources 13. The second inclination angle is less than the first inclination angle to reflect, to the greater extent, the polarized light polarized in the certain direction and emitted by the polarization light source 13 to the display panel 11 of the transparent display device, thereby realizing a corresponding backlight effect.

Further, it should be noted that in the embodiment of the present invention, for any one row of polarization light splitting sheets 121 in the array 12 of polarization light splitting sheets, the respective polarization light splitting sheets in the same row of polarization light splitting sheets 121 may be inclined along the same direction. However, the polarization light splitting sheets 121 in the different rows of the array 12 of polarization light splitting sheets may be inclined along the same direction or along different directions. The embodiments of the present invention do not limit this. As shown in FIGS. 1-3, the present invention is exemplarily illustrated based on the example in which respective rows of polarization light splitting sheets 121 in the array 12 are inclined along the same direction.

Further, in the embodiment of the present invention, one or more polarization light sources 13 may be provided for one or more rows of polarization light splitting sheets 121 which are inclined along the same direction. The embodiments of the present invention do not limit this. The respective polarization light sources 13 corresponding to the respective rows of polarization light splitting sheets 121 may be arranged to face inner surfaces of the respective rows of polarization light splitting sheets 121, and the description thereof is omitted from the embodiments of the present invention.

For example, in a case where the respective rows of polarization light splitting sheets 121 in the array 12 of polarization light splitting sheets are inclined along the same direction, the respective polarization light sources 13 of the at least one polarization light source 13 may be provided at a side to which the inner surfaces of the respective polarization light splitting sheets 121 face, that is, may be provided to face the inner surfaces of the respective polarization light splitting sheets 121 so as to emit the polarized light polarized in the certain direction onto the inner surfaces of the respective polarization light splitting sheets 121 in the array 12 of polarization light splitting sheets, respectively.

Further, in the embodiment of the present invention, one end (i.e., the bottom end) of each of the polarization light splitting sheets 121 in the array 12 of polarization light splitting sheets may be attached to the side of the display panel 11 facing the array 12 of polarization light splitting sheets by a corresponding transparent attachment layer 15. The detailed description about it is omitted herein.

It can be appreciated from the foregoing description that the embodiments of the present invention provide transparent display devices. In the technical schemes of the embodiments of the present invention, since the polarization light source capable of emitting the polarized light polarized in the certain direction can be used as a backlight source when a backlight is needed, and at the same time the array of polarization light splitting sheets provided at the side of the display panel of the transparent display device on which no polarizer is provided is used to reflect the polarized light polarized in the certain direction and emitted by the polarization light source to the display panel of the transparent display device so as to realize a corresponding backlight, or when no backlight is needed, the array of polarization light splitting sheets can be used to transmit the polarized light polarized in the direction perpendicular to the certain direction and coming from the ambient light to the display panel of the transparent display device so as to realize the transparent display. The light transmittance and the transparent effect of the display device can be enhanced and practicability of the display device can be improved, based on realization of an adjustable backlight source for transparent display.

It should be noted that the above described embodiments are preferred embodiments of the present invention only and are not intended to limit the present invention. It would be appreciated by those skilled in the art that various changes and substitutions may be made without departing from the principle and spirit of the disclosure. Such changes and substitutions fall within the scope of the disclosure.

What is claimed is:

1. A transparent display device, comprising:
   a display panel with a polarizer being provided on one side thereof and no polarizer being provided on the other side thereof;
   an array of polarization light splitting sheets provided on the side of the display panel on which no polarizer is provided, wherein a plane where the lines connecting a top and a bottom of each polarization light splitting sheet in the array of polarization light splitting sheets exist is arranged at a first inclination angle to the display panel, and the first inclination angle is greater than zero degree and less than 90 degrees; and
   at least one polarization light sources provided at one side of the array of polarization light splitting sheets and emitting a polarized light polarized in a certain direction towards an inner surface of at least one polarization light splitting sheet in the array of polarization light splitting sheets;
   wherein the polarized light polarized in the certain direction, emitted by a corresponding polarization light source of the at least one polarization light sources and incident onto the inner surface of corresponding polarization light splitting sheet can be reflected to the display panel, and the polarized light polarized in a direction perpendicular to the certain direction, from an ambient light and incident onto an outer surface of each polarization light splitting sheet can be transmitted to the display panel;
   wherein the inner surface of each polarization light splitting sheet is the surface of the polarization light splitting sheet facing the display panel, and the outer surface of each polarization light splitting sheet is the surface of the polarization light splitting sheet facing away from the display panel.

2. The transparent display device according to claim 1, wherein the first inclination angle is greater than or equal to 30 degrees and less than or equal to 60 degrees.

3. The transparent display device according to claim 1, wherein the respective polarization light splitting sheets in the array of polarization light splitting sheets are arc-shaped polarization light splitting sheets or linear polarization light splitting sheets.

4. The transparent display device according to claim 2, wherein the respective polarization light splitting sheets in the array of polarization light splitting sheets are arc-shaped polarization light splitting sheets or linear polarization light splitting sheets.

5. The transparent display device according to claim 1, wherein horizontal projections of all the polarization light splitting sheets in the array of polarization light splitting sheets on the display panel cover a display region of the display panel completely.

6. The transparent display device according to claim 5, wherein horizontal projections of any two adjacent polarization light splitting sheets in the array of polarization light splitting sheets on the display panel are partly overlapped with each other or contact but not overlapped with each other.

7. The transparent display device according to claim 1, wherein the respective polarization light splitting sheets in the array of polarization light splitting sheets comprise reflection layers which are formed by a multi-layer film, and the multi-layer film is formed by alternatively arranging two kinds of materials having different refractive indexes.

8. The transparent display device according to claim 7, wherein each layer of film in the multi-layer film has a thickness equal to ¼ of a main wavelength of the polarized light polarized in the certain direction and emitted from the polarization light source.

9. The transparent display device according to claim 1, wherein the at least one polarization light sources are collimation polarization light sources.

10. The transparent display device according to claim 9, wherein each of the at least one polarization light sources comprises at least one light source chips, at least one collimators configured to collimate the light ray emitted from the at least one light source chips, and a light-converting element configured to convert the light ray collimated by the collimators into the polarized light polarized in the certain direction.

11. The transparent display device according to claim 10, wherein the light-converting element is a dual brightness enhancement film (DBEF).

12. The transparent display device according to claim 10, wherein the light source chips are light-emitting diode (LED) chips or metal halogen lights.

13. The transparent display device according to claim 10, wherein each of the at least one polarization light sources further comprises a support and heat dissipation element configured to support the light source chips and the collimators and provide a heat dissipation function for the at least one light source chips.

14. The transparent display device according to claim 1, wherein the respective polarization light sources are obliquely arranged in such a manner that the central axes of the respective polarization light sources are arranged at a second inclination angle to the display panel, and wherein the central axes of the respective polarization light sources are parallel to the polarized light polarized in the certain direction and emitted by the respective polarization light sources, the second inclination angle being less than the first inclination angle.

15. The transparent display device according to claim 14, wherein the respective polarization light sources are mounted on respective light source brackets.

16. The transparent display device according to claim 1, wherein the respective polarization light splitting sheets in any row of polarization light splitting sheets of the array of polarization light splitting sheets are inclined along the same direction, and wherein the polarization light splitting sheets in the different rows of the array of polarization light splitting sheets are inclined along the same direction or along different directions, and the polarization light sources corresponding to the respective rows of polarization light splitting sheets are arranged to face inner surfaces of the respective rows of polarization light splitting sheets.

17. The transparent display device according to claim 1, wherein one end of each of the polarization light splitting sheets in the array of polarization light splitting sheets is attached to the side of the display panel facing the array of polarization light splitting sheets by a corresponding transparent attachment layer.

18. The transparent display device according to claim 1, wherein the display panel comprises a color filter substrate, an array substrate and a liquid crystal layer filled between the color filter substrate and the array substrate, and wherein the polarizer is provided at the side of the color filter substrate facing away from the liquid crystal layer.

19. The transparent display device according to claim 1, wherein the polarized light polarized in the certain direction is an S polarized light, and the polarized light polarized in the direction perpendicular to the certain direction is a P polarized light.

\* \* \* \* \*